United States Patent [19]

Bulcsu

[11] Patent Number: 5,333,395
[45] Date of Patent: Aug. 2, 1994

[54] DRYING APPARATUS

[75] Inventor: Istvan Bulcsu, Langenfeld, Fed. Rep. of Germany

[73] Assignee: VITS Maschinenbau GmbH, Langenfeld/Rhld., Fed. Rep. of Germany

[21] Appl. No.: 100,576

[22] Filed: Jul. 30, 1993

[30] Foreign Application Priority Data

Aug. 7, 1992 [DE] Fed. Rep. of Germany ....... 4226107

[51] Int. Cl.⁵ .............................................. F26B 19/00
[52] U.S. Cl. .......................................... 34/79; 34/86; 34/644
[58] Field of Search ................... 34/79, 155, 156, 160, 34/35, 86, 32

[56] References Cited

U.S. PATENT DOCUMENTS

| | | | |
|---|---|---|---|
| 3,706,445 | 12/1972 | Gentry | 34/79 X |
| 4,575,952 | 3/1986 | Bodenan et al. | |
| 4,780,965 | 11/1988 | Grafen et al. | 34/79 X |
| 5,038,495 | 8/1991 | Jacobs et al. | 34/156 X |

FOREIGN PATENT DOCUMENTS

| | | |
|---|---|---|
| 0326228 | 2/1989 | European Pat. Off. |
| 0326227 | 8/1989 | European Pat. Off. |
| 0543439 | 5/1993 | European Pat. Off. |
| 2412446 | 9/1975 | Fed. Rep. of Germany |
| 2616347 | 10/1977 | Fed. Rep. of Germany |
| 8115801 | 5/1981 | Fed. Rep. of Germany |
| 3012880 | 10/1981 | Fed. Rep. of Germany |
| 8332567 | 11/1983 | Fed. Rep. of Germany |

*Primary Examiner*—Henry A. Bennet
*Attorney, Agent, or Firm*—Michael J. Striker

[57] ABSTRACT

A drying apparatus for continuous product webs which contain solvents becoming volatile during drying, the drying apparatus has a dryer having means for transporting a treatment medium, an inlet slot and an outlet slot, and nozzle boxes provided at both sides of the inlet slot and the outlet slot, a cooling tunnel directly connected with the dryer, a combustion chamber for thermal combustion of a solvent which becomes volatile during drying, a first heat exchanger and a second heat exchanger, each having a primary side and a secondary side, a fireplace, a waste gas channel extending from the dryer through the secondary side of the first heat exchanger to an inlet of the combustion chamber and then from an outlet of the combustion chamber through the primary side of the first heat exchanger and the primary side of the second heat exchanger to the fireplace, a suction tube extending from the cooling tunnel, a conduit connected with the nozzle boxes through the secondary side of the second heat exchanger provided for pre-heated treatment air. The outlet of the combustion chamber is provided with a connection to the dryer, and the suction tube is provided with a suction blower which is connected at a pressure side with the secondary side of the second heat exchanger.

8 Claims, 4 Drawing Sheets

DRYING APPARATUS

BACKGROUND OF THE INVENTION

The present invention relates to a drying apparatus for continuous product webs which during drying contain a solvent becoming volatile, in particular for printed and/or laminated paper webs.

During drying of the above-mentioned product, the drying air must be maintained at a temperature of substantially 200° C. in order to evaporate the solvent. The concentration of the solvent vapor in the dryer atmosphere must not exceed a predetermined value. Therefore waste gas must be aspirated from the dryer and replaced with a corresponding quantity of fresh air. The solvent vapors contained in the waste gas are converted by thermal combustion into non-damaging substances, in particular carbon dioxide and water. The considerable heat quantity which is released during the thermal combustion is partially recovered in known drying apparatuses. In particular pure gas heated over 700° C. is partially recirculated into the drying and/or a heat carrier utilized for heating, which for example serves for heating the dryer atmosphere. The heat balance is improved with a reduction of the pure gas quantities discharged into the atmosphere and a reduction of their temperature.

One of the known drying apparatuses is disclosed for example in the German document DE-GM 81 15 801. In this apparatus the aspiration tube extending from the cooling tunnel opens into a channel portion which guides from the dryer to the secondary stage of the first heat exchanger. Due to the admixing of the air aspirated through the cooling tunnel, the waste gas is increased and cooled. A blower transports the waste gas mixture to the first heat exchanger and to the combustion chamber. The total pure gas stream discharged from the combustion chamber is first supplied through the primary side of the first heat exchanger and after cooling to substantially 500° C. to the primary side of the second heat exchanger. From there the total pure gas stream after further cooling is expelled into the atmosphere. For obtaining high heat recovery with large gas quantities, large heat exchangers are required.

Another drying apparatus is disclosed in the German document DE-PS 26 16 347. It differs from the above-described drying apparatus in that has only one heat exchanger. A suction channel which extends from the cooling tunnel opens, as in the first cited patent document, into a waste gas channel which connects the dryer with the secondary side of the heat exchanger. From there the waste gas channel extends to an inlet of the internal combustion chamber and from its outlet through the primary side of the heat exchanger to a fireplace. A branching conduit leads back from the outlet of the combustion chamber to the nozzle box of the dryer. Therefore, the mass stream which flows at the secondary side through the heat exchanger is increased and cooled. The partial stream which flows through the primary side of the heat exchanger is cooled there for example to 300° C. The primary side outlet temperature which is important for the heat losses cannot be lower than the secondary side inlet temperature. For obtaining a lower pure gas temperature, a larger heat exchange is required. A disadvantage of this known drying apparatus is that the gas stream which is supplied to the nozzle box is very hot, namely over 700° C. The supply conduit and the nozzle cannot withstand such conditions for a long time.

The European patent document EP-A1-0 326 228 discloses an arrangement for heating a dryer and for burning the solvent vapors contained in the waste gas, in which a heat exchanger with a combustion chamber is integrated to an elongated, compact structural unit. The combustion chamber is connected with the heat exchanger in a joint housing and has two hair-needle shaped gas trains. The combustion chamber is provided with an outlet opening for a partial stream of the pure gas, which serves for heating the dryer temperature. The structural unit can be arranged inside the dryer. In this case, however, the dimensioning of the heat exchanger within certain limits is needed. Under the conditions of the practice the raised heat utilization must be lower than in the pre-heated drying apparatus.

SUMMARY OF THE INVENTION

Accordingly, it is an object of the present invention to provide a drying apparatus which avoids the disadvantages of the prior art.

More particularly, it is an object of the present invention to provide a drying apparatus which is improved in that, with smaller heat exchangers it obtains an improved recovery.

In keeping with these objects and with others which will become apparent hereinafter, one feature of the present invention resides, briefly stated, in a drying apparatus for continuous product webs which contain during drying an evaporatable solvent, especially for printed and/or laminated paper webs, which has a dryer provided in its interior with nozzles and ventilators for blowing or circulating a hot treatment medium and having at both sides of the inlet and outlet slots additional nozzle boxes, a cooling tunnel immediately connected with the dryer, a combustion chamber for thermal combustion during drying of a solvent which becomes volatile, a first and a second heat exchanger, a waste gas passage extending from the dryer through the secondary side of the first heat exchanger to an inlet of the combustion chamber and from its outlet through the primary side of the first heat exchanger and the primary side of the second heat exchanger to a chimney, and a suction pipe extending from the cooling tunnel, and a conduit extending through the secondary side of the second heat exchanger to the nozzle box for pre-heated treatment air, wherein, in accordance with the present invention a connection is provided between the outlet of the combustion chamber and the dryer and the suction pipe leads to its own suction blower which at its pressure side is connected with the secondary side of the second heat exchanger.

In this construction the secondary side of the first heat exchanger is supplied with the waste gas withdrawn from the dryer without admixing of the air aspirated through the cooling tunnel. A part of the pure gas is supplied in circulation into the dryer. Therefore the remaining pure gas partial stream which passes through the primary side of the first heat exchanger is smaller than the secondary side waste gas stream. It cools down faster in correspondence with the ratio of the mass stream, so that with a relatively small first heat exchanger a temperature lowering to under 300° C. can be reached. The pure gas partial stream supplied to the heat exchanger is not only substantially smaller when compared with the prior art, but also substantially cooler. At the secondary side a relatively small, already pre-heated [even insignificantly] air quantity is supplied to the second heat exchanger, and a heating to approximately 200° C. is sufficient. Therefore, the second heat exchanger can be made substantially smaller as well. The pure gas expelled into the atmosphere with a temperature of only around 150° C. involves only a part, for example, substantially one half, of the waste gas quantity withdrawn from the dryer. Therefore, heat loss is very low. A further advantage is that with different production conditions the oil vapor concentration in the dryer atmosphere can be maintained in a simple manner. Depending on the quantity per unit time of releasing solvent vapors, the waste gas withdrawn from the dryer and the partial quantity of the recirculated pure gas can be varied.

In accordance with another feature of the present invention, the nozzle boxes have nozzle openings with blow directions which are oriented at an acute angle to a web guiding plane to the inlet gap. In such a construction the entraining of cold surrounding air into the inlet gap is almost completely prevented.

In accordance with still further features of the present invention, the first heat exchanger with a combustion chamber can be assembled in a structural unit arranged directly over the dryer, while the second heat exchanger can be arranged in the dryer chamber. With these features the heat losses are reduced.

In accordance with still another feature of the present invention, the second heat exchanger can be composed of two units including one unit located under the web guiding plane and another unit located over the web guiding plane. Such an apparatus has advantages with regard to its construction.

Finally, nozzle boxes can be arranged in the cooling tunnel above and below the web guiding plane and connected through a conduit system with the pressure side of the suction fan. In this case the product web is already pre-cooled before reaching the first cooling roller.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
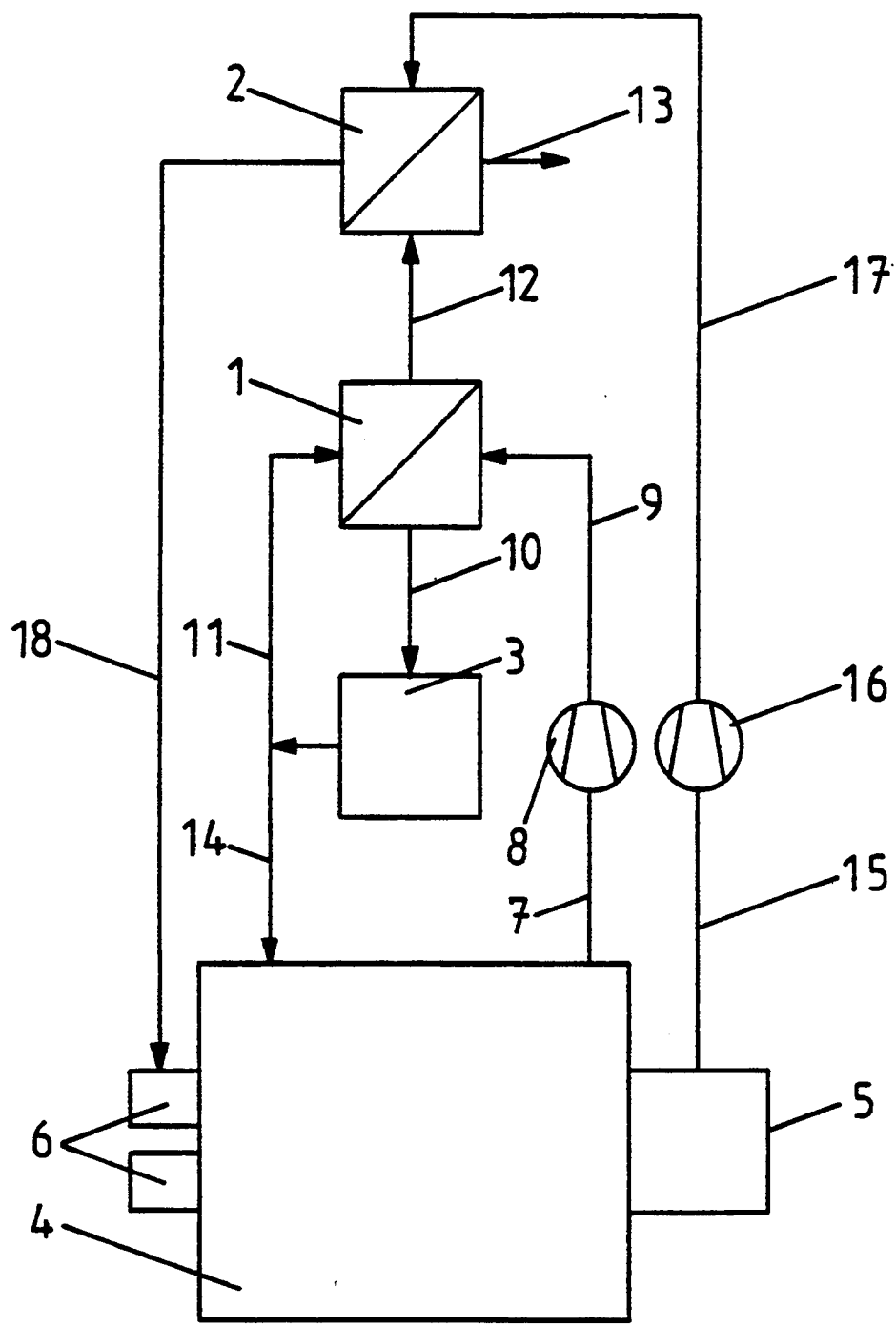
FIG. 1 is a view schematically showing a path of a gas stream.

A drying apparatus in accordance with the present invention has a first heat exchanger 1, a second heat exchanger 2, a combustion chamber 3, and a dryer 4 with a directly connectable cooling tunnel 5, as can be seen from FIG. 1. Nozzle boxes 6 are arranged at both sides of an inlet slot of the dryer. The outlet slot is also provided with nozzle boxes which, however, are not shown in FIG. 1 for the sake of simplicity of illustration.

Waste gas with a temperature of approximately 200° C. is first aspirated from the dryer 4 by a suction blower 8 through a line 7 and then supplied to the secondary side of heat exchanger 1 through the line 9. The "secondary side" is a side through which the gas stream receiving the heat flows. Correspondingly, the "primary side" is a side through which the gas stream giving out the heat flows. The waste gas pre-heated to approximately 500° C. is supplied through the line 10 to the combustion chamber 3. A partial stream of the pure gas which exits the combustion chamber 3 and is heated by combustion of the volatile substances to over 700° C., is supplied through the line 11 to the primary side of the heat exchanger 1. In the heat exchanger 1 it gives out a part of its heat to the inflowing waste gas and thereby cools to below 300° C.

The pure gas is supplied through the line 12 to the primary side of the heat exchanger 2 and after cooling to 150° C. is supplied through the line 13 to a chimney. From there it is expelled into the atmosphere. A part of the hot pure gas is supplied back directly to the dryer through a direct connection provided by the line 14.

Air is aspirated through the cooling tunnel 5 in accordance with the line 15 by a suction fan 16. It is supplied to the secondary side of the heat exchanger 2 through the line 17. There it is heated to substantially 200° C. and finally supplied to the nozzle boxes 6 through the line 18.

Figure 2:
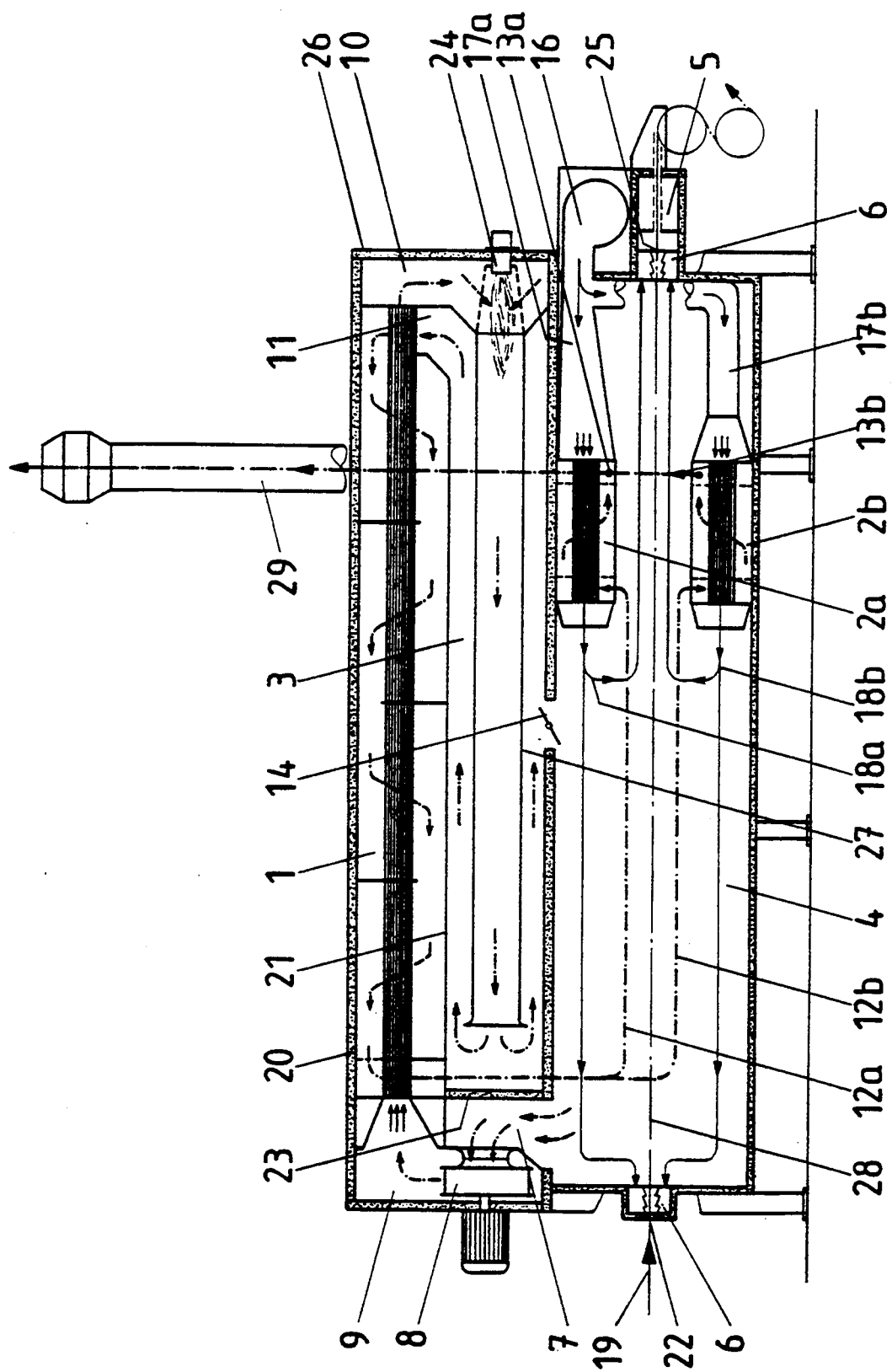
FIG. 2 is a simplified view of a construction of a drying apparatus in accordance with the present invention.

In FIG. 2 the parts which are similar to the parts of FIG. 1 are provided with the same reference numerals.

The dryer 4 is composed of several fields which are arranged in a row near one another in a through-going direction identified with the arrow 19. Each field is provided in a known manner with nozzle boxes for floating guidance of the product web, with associated circulating fans and in some cases heating devices. The heat exchanger 1 and the combustion chamber 3 are arranged in a separate chamber 20 located above the dryer 4 and separated from the dryer by a horizontal intermediate plate. The internal combustion chamber has a longitudinally extending housing 21 with an end which faces the inlet slot 22 and is closed by an end wall 23. The internal combustion chamber has a burner 24 which is mounted in an outlet slot 25 of a neighboring end wall 26, and an ignition tube 27 which extends from the burner 24 in the housing 21 close to the end wall 23 at a lateral distance from it.

Figure 4:
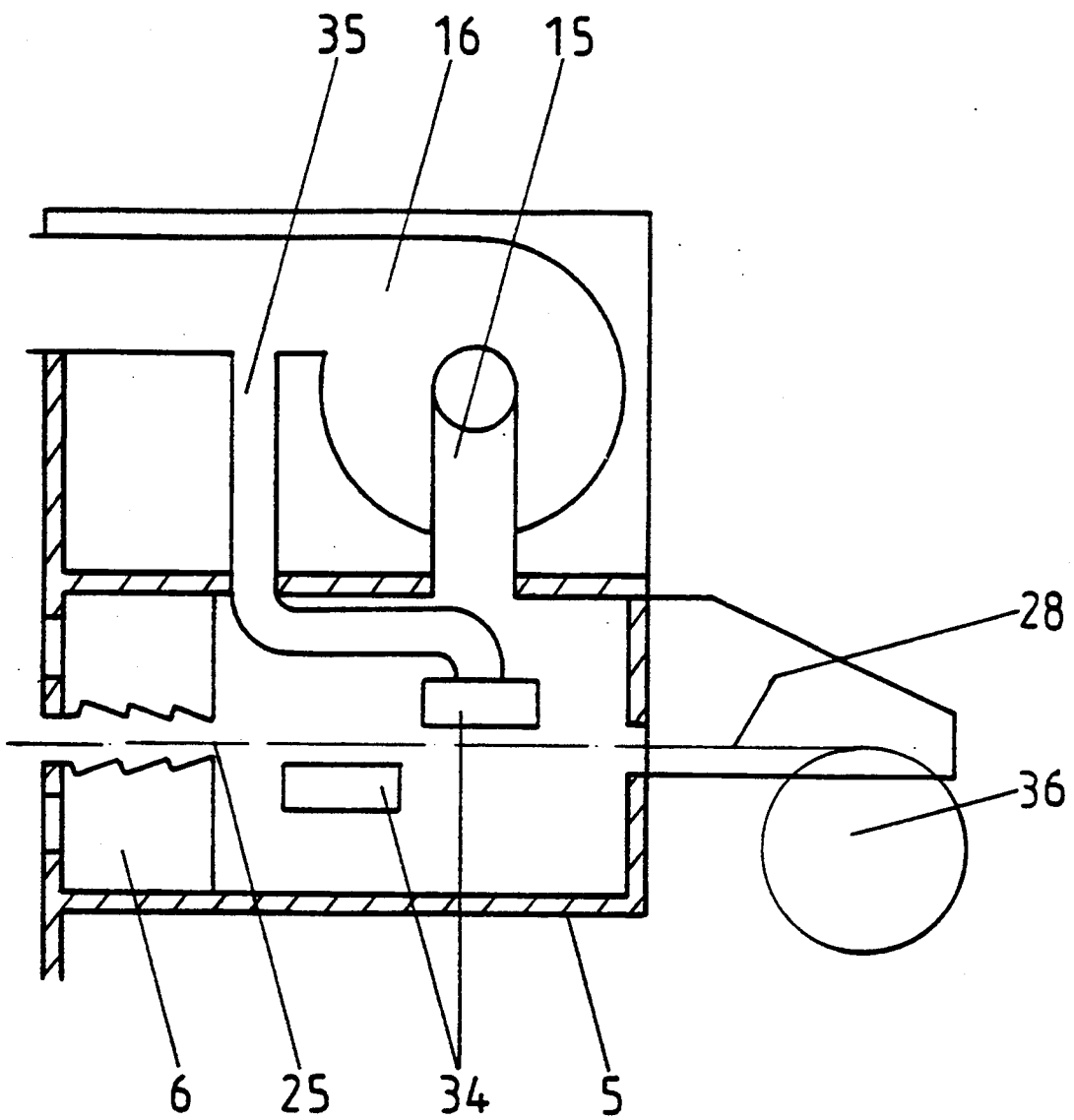
FIG. 4 is a view showing a vertical longitudinal cross-section through a cooling tunnel of the inventive drying apparatus.

The heat exchanger 1 arranged over the combustion chamber 3 is formed as a tubular bundle heat exchanger, and the whole unit forms the two-door passages in the secondary side. The second heat exchanger is composed of two units 2a and 2b which are accommodated in the dryer 4. It is also formed as a tubular bundle heat exchanger. The unit 2a is located above the web guidance plane 28 while the unit 2b is located below the web guidance plane. The units 2a and 2b are closed by tubular conduit 12a, 12b at the primary side of the heat exchanger 1 connected by conduit 13a, 13b with the chimney 29. At the secondary side they communicate through pipes 17a, 17b with the suction blower 16 which, as shown in FIG. 4, is connected at the suction side with the inner chamber of the cooling tunnel 5. The units 2a, 2b are also connected by tubes 18a, 18b with the nozzle boxes 6 arranged on the inlet slot and the outlet slot 22, 25 correspondingly.

Figure 3:
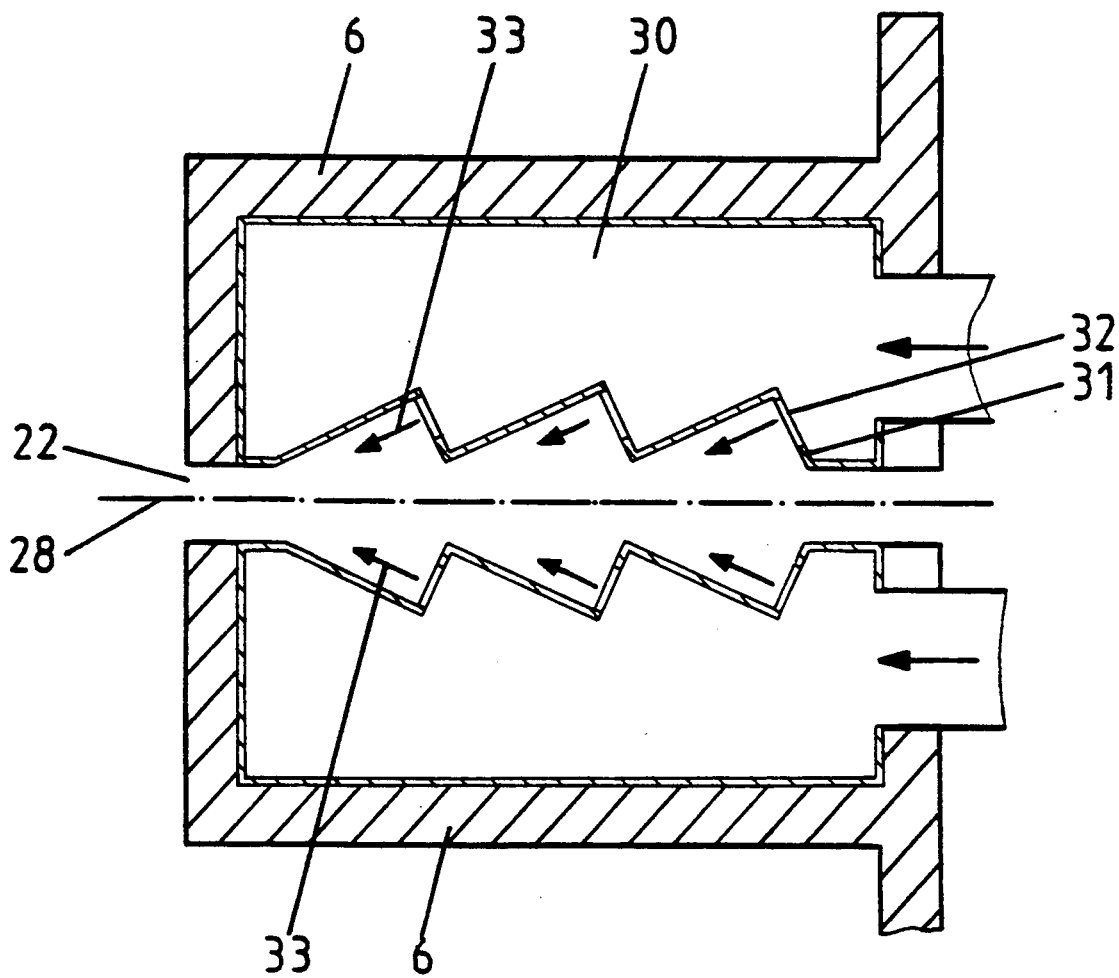
FIG. 3 is a view showing a section of a nozzle box arranged in an inlet slot, on an enlarged scale.

As shown in FIG. 3 the wall of the nozzle box 6 which faces the web guidance plane 28 has a saw-tooth-shaped contour in cross-section. The steeper flanks 31 of the saw teeth which face the inlet slot 22 are provided with nozzle openings 32. Therefore the blow jets identified with arrows 33 are directed at an acute angle to the web guidance plane 28 toward the inlet slot 22. When the outlet speed of the blow jets corresponds to the negative pressure in the interior of the dryer 4, the entraining of cold surrounding air through the inlet slot 22 is practically completely prevented. Substantially the same nozzle box 6 is arranged at the outlet slot 25. The required fresh air quantity is aspirated to a greater part through the cooling tunnel 5. Thereby in this region the low concentration of the post-evaporated solvent is retained. Therefore, the condensation of the cooling rollers is substantially avoided.

In FIG. 4 nozzle boxes 34 with air cushion nozzles are arranged in the cooling tunnel 5 above and below the web guidance plane 21. They communicate through a conduit system 35 with the pressure side of the suction blower 16. Due to intensive action with returning air, a pre-cooling of the product web before it reaches the first cooling roller 36 is provided.

It will be understood that each of the elements described above, or two or more together, may also find a useful application in other types of constructions differing from the types described above.

While the invention has been illustrated and described as embodied in a drying apparatus for continuous product webs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drying apparatus for continuous product webs which contain solvents becoming volatile during drying, the drying apparatus comprising a dryer having means for transporting a treatment medium, an inlet slot and an outlet slot, and nozzle boxes provided at both sides of said inlet slot and said outlet slot; a cooling tunnel directly connected with said dryer; a combustion chamber for thermal combustion of a solvent which becomes volatile during drying; a first heat exchanger and a second heat exchanger, each having a primary side and a secondary side; a chimney; a waste gas channel extending from said dryer through said secondary side of said first heat exchanger to an inlet of said combustion chamber and then from an outlet of said combustion chamber through said primary side of said first heat exchanger and said primary side of said second heat exchanger to said chimney; a suction tube extending from said cooling tunnel; a conduit connected with said nozzle boxes through said secondary side of said second heat exchanger provided for pre-heated treatment air, said outlet of said combustion chamber being provided with a connection to said dryer, and said suction tube being provided with a suction blower which is connected at a pressure side with said secondary side of said second heat exchanger.

2. A drying apparatus as defined in claim 1, wherein said transporting means in said dryer includes nozzles for blowing and circulating fans for circulating the hot treatment medium.

3. A drying apparatus as defined in claim 1, wherein said nozzle boxes have nozzle openings with blow directions directed at an acute angle to a web guidance plane toward said inlet gap.

4. A drying apparatus as defined in claim 1, wherein said first heat exchanger and said combustion chamber being assembled with one another to form a structural unit which is arranged directly on said dryer.

5. A drying apparatus as defined in claim 1, wherein said second heat exchanger is accommodated in said dryer.

6. A drying apparatus as defined in claim 5, wherein said second heat exchanger is composed of two units including one unit located under a web guidance plane and another unit located over said web guidance plane.

7. A drying apparatus as defined in claim 1, wherein said cooling tunnel is provided with nozzle boxes located above a web guidance plane and below said web guidance plane, said nozzle boxes being connected with said pressure side of said suction fan.

8. A drying apparatus as defined in claim 7; and further comprising a conduit system connecting said nozzle boxes with said pressure side of said suction fan.

* * * * *